(12) United States Patent
Hasegawa et al.

(10) Patent No.: US 8,239,542 B2
(45) Date of Patent: Aug. 7, 2012

(54) ANALOG SIGNAL INPUT/OUTPUT SYSTEM USING NETWORK LINKS

(75) Inventors: Mikio Hasegawa, Tokyo (JP); Hiroyuki Morikawa, Tokyo (JP); Udana Bandara, Tokyo (JP); Masugi Inoue, Tokyo (JP)

(73) Assignee: National Institute of information and Communications Technology, Tokyo (JP)

( * ) Notice: Subject to any disclaimer, the term of this patent is extended or adjusted under 35 U.S.C. 154(b) by 231 days.

(21) Appl. No.: 10/579,880

(22) PCT Filed: Nov. 19, 2004

(86) PCT No.: PCT/JP2004/017292

§ 371 (c)(1),
(2), (4) Date: Mar. 30, 2007

(87) PCT Pub. No.: WO2005/050944

PCT Pub. Date: Jun. 2, 2005

(65) Prior Publication Data

US 2008/0016223 A1    Jan. 17, 2008

(30) Foreign Application Priority Data

Nov. 19, 2003   (WO) .................. PCT/JP03/14721

(51) Int. Cl.
*G06F 15/16*      (2006.01)
(52) U.S. Cl. ......................................... 709/227; 700/94
(58) Field of Classification Search .................. 709/227; 700/94

See application file for complete search history.

(56) References Cited

U.S. PATENT DOCUMENTS

| | | | | |
|---|---|---|---|---|
| 5,367,301 A * | 11/1994 | Stiltner et al. | ............. | 341/144 |
| 5,896,099 A * | 4/1999 | Yamauchi | ............. | 341/50 |
| 6,137,485 A * | 10/2000 | Kawai et al. | ............. | 715/719 |
| 6,981,278 B1 * | 12/2005 | Minnig et al. | ............. | 726/12 |
| 7,051,337 B2 * | 5/2006 | Srikantan et al. | ............. | 719/318 |
| 7,685,287 B2 * | 3/2010 | Moutafov | ............. | 709/227 |
| 2002/0072816 A1 * | 6/2002 | Shdema et al. | ............. | 700/94 |
| 2002/0133248 A1 * | 9/2002 | Fay et al. | ............. | 700/94 |
| 2004/0039462 A1 * | 2/2004 | Chen | ............. | 700/94 |

(Continued)

FOREIGN PATENT DOCUMENTS

JP       2002-077241 A      3/2002

(Continued)

OTHER PUBLICATIONS

Quinton, Reg; "An Introduction to Socket Programming"; May 2, 1997; v1.8; pp. 1-16.*

(Continued)

*Primary Examiner* — Jeffrey Nickerson
(74) *Attorney, Agent, or Firm* — Warn Partners, P.C.

(57) ABSTRACT

An analog signal input/output system in which an analog signal input terminal converts an input analog signal to a digital signal and transmits the digital signal to a host computer via a network, while a digital signal generated by the host computer is transmitted through the network to an analog signal output terminal and converted therein to an analog signal to be outputted. Two connections of upstream and downstream sockets between the host computer and the analog signal input/output device. These connections are selectively used to provide communication of control signals and data. Exemplary analog signals include input signals from a microphone, output signals to a speaker, and input/output data to/from a sensor, a measuring device and the like.

20 Claims, 15 Drawing Sheets

U.S. PATENT DOCUMENTS

| | | | |
|---|---|---|---|
| 2004/0254661 A1* | 12/2004 | Ng et al. | 700/94 |
| 2005/0044372 A1* | 2/2005 | Aull et al. | 713/176 |
| 2011/0153049 A1* | 6/2011 | Buckwalter | 700/94 |

FOREIGN PATENT DOCUMENTS

| | | |
|---|---|---|
| JP | 2003-259342 A | 9/2003 |

OTHER PUBLICATIONS

Poon et al; "Performance of buffer-based request-reply scheme for VoD streams over IP networks"; Aug. 2000; Computer Networks, vol. 32, Issue 2; Elsevier Science; pp. 229-240.*

Zdepski et al; "Statistically Based Buffer Control Policies for Constant Rate Transmission of Compressed Digital Video"; Jun. 1991; IEEE Transactions on Communications; vol. 39, No. 6; pp. 947-957.*

Jo et al; "Synchronized one-to-many media streaming with adaptive playout control", Dec. 10, 2002; SPIE 4861; pp. 71-82.*

MDOT; "Edward N. Hines (1870-1938)"; Sep. 19, 2005; Michigan Department of Transportation; pp. 1; retrieved http://www.michigan.gov/printerFriendly/0,1687,7-151-9620_11154_41535-126420--,00.html on Jan. 7, 2009.*

* cited by examiner

| command (voice data) | 1byte | PCM |
|---|---|---|
| channel | 1bit | mono:0   stereo:1 |
| bits per a sample | 1bit | 8bits:0   16bits:1 |
| volume | 6bits | min:00H   max:3FH |
| sampling rate | 2bytes | AC44H when44.1KHz |
| length of data | 2bytes | whole data bytes |
| PCM data | 1frame | ※ |

FIG. 12

ANALOG SIGNAL INPUT/OUTPUT SYSTEM USING NETWORK LINKS

BACKGROUND OF THE INVENTION (1) Field of the Invention

The present invention relates to a system that inputs and outputs analog electrical signals through computer network links and, more particularly, to an arrangement in which an analog signal input/output device performs analog-to-digital and digital-to-analog conversions.

(2) Description of the Related Art

When voice is input from and output to a personal computer, a driver in the operating system is typically used from an application that handles sound to enable a sound card. In a known arrangement, the sound card is equipped with a speaker terminal and a microphone terminal; the speaker terminal is used to output voice from the computer to the speaker, and the microphone connected to the microphone terminal is used to enter voice.

Particularly, recent personal computers incorporating a CD drive and a DVD drive are widely used to reproduce multimedia information on the computer or to reproduce music contents and video contents downloaded from a network.

Widespread use of the Internet, local area networks (LANs), and the like has also enabled constant connection of a personal computer to the networks and communication with computers and devices on the networks.

When voice is output from the computer in this environment, the above-mentioned arrangement in which devices are connected to the speaker terminal and microphone terminal has restrictions on the installation place and the distance to the computer. Another problem is that a plurality of devices cannot be selectively handled unless a plurality of terminals are provided.

Since home wireless LANs are becoming widespread and freedom in the usage environment, such as for notebook computers, is being increased, devices are preferably connected to the notebook computers via a network.

Printers and scanners, for examples, are already provided with a wireless LAN adapter, so they are widely shared by computers connected to a wireless LAN. All of this type of printers and scanners are devices that handle digital signals having a high affinity with networks and not devices that input and output analog signals.

Voice data may be sent to a remote computer through a network, and the computer outputs the data as voice. This arrangement is used between dedicated terminals in a videophone system or the like. This arrangement is, however, not available for connecting an existing computer to an analog device, so its versatility is low.

General-purpose devices that freely accept analog signals and have them processed by a computer are not provided. There is a desire for a device that can freely input not only voice but also analog signals obtained by measuring instruments and the like into a computer.

In a conventional known example disclosed in Japanese unexamined patent application No. 2003-316375, voice is coded by a terminal and sent to a host computer; the host computer then decodes the coded voice for voice recognition and returns the result to the terminal. Technique to use a general-purpose personal computer as the terminal and have data processing with a high load performed by the host computer, as described above, is known.

Patent Document 1: Japanese unexamined patent application No. 2003-316375

In the above method, however, there is no need to strictly transfer obtained voice data without a delay, so, in practice, any technology for transferring measured data and voice data in real time is not disclosed.

Japanese unexamined patent application No. 2003-163703 discloses a network address translation device that enables heavy voice communications to be established simultaneously between different networks. According to the disclosure, upon receipt of a call setting request, a network address translation (NAT) control unit, which performs address translation, creates a new voice transmission port. The primary purpose of the NAT control unit is to create voice transmission ports on two different networks so that voice communication can be carried out between them, so it is assumed that one socket is used for control and another socket is used for a large amount of voice communication. The two sockets are only selectively used. Various types of control information cannot flow in the control socket during voice communication. When the method of coding analog signals is changed or the method of reproducing the signals is controlled, therefore, a socket dedicated to analog signal transmission must be provided for a signal that changes the coding method or controlling the reproduction method.

Patent Document 2: Japanese unexamined patent application No. 2003-163703

There is also a problem in analog signal input/output; it is difficult to immediately reflect characteristic information indicating the characteristics of the analog signal in the processing at the communication destination. If the analog signal is a voice signal, for example, when a voice level, a sampling rate, the number of bits per sample, and other characteristic information cannot be sent immediately to the device at the communication destination, serious failures may occur during reproduction or recording.

When signals are sent and received via a network, delays may be caused depending on the network situation, so the reliability with which analog signals are processed without a delay is low. Particularly, when stereo voice is simultaneously output from devices on a network, delays may be caused and accumulated separately. When this happens, voice may become completely out of phase.

BRIEF SUMMARY OF THE INVENTION

The present invention addresses the problems with the conventional technologies described above with the object of providing an analog signal input terminal that converts received analog signals to digital signals and sends the digital signals to a host computer via a network as well as an arrangement in which digital signals generated by the host computer are sent to an analog signal output terminal and the digital signals are converted to analog signals by the terminal and then output.

In the background of the conventional technologies, the present invention was devised; it provides means described below.

The invention is an analog signal input system that uses an analog signal input terminal to convert analog signals into digital signals and send the converted digital signals to a host computer via a network; the analog signal input terminal has at least an input unit for accepting analog signals, an A/D converter for converting the analog signals into digital signals, a network controller for controlling data transmission and reception, to which an Internet protocol (IP) connection is possible, a terminal-side IP connection establishing unit for establishing two connections, that is, an inbound socket connection and an outbound socket connection, to and from the host computer, a control signal processing unit for receiving control signals related to at least a start request and a stop request from the host computer, and a signal transmitting unit for sending digital signals according to the control signals.

The host computer has at least a network adapter for controlling data transmission and reception, to which an IP connection is possible, a host-side IP connection establishing unit for establishing two connections, that is, an inbound socket connection and an outbound socket connection, to and from the analog signal input terminal, a control signal processing unit for sending control signals related to at least a start request and a stop request to the analog signal input terminal, an application processing unit for executing an application and allowing the application to use the above digital signals, and an IP connection disconnecting unit for disconnecting the inbound socket connection and the outbound socket connection.

In the inventive analog signal input system, the terminal-side IP connection establishing unit in the analog signal input terminal establishes an inbound socket connection to the host computer when it detects an outbound socket connection from the host computer, and the host-side IP connection establishing unit in the host computer establishes an outbound socket connection to the analog signal input terminal.

In the inventive analog signal input system, the analog signal input terminal is provided with a microphone, from which output signals are input into the input unit for accepting input signals, enabling voice to be retrieved through the network.

In the inventive analog signal input system, the network is a wireless communication network; the network controller and network adapter are compatible with the wireless communication network.

The network uses the user datagram protocol (UDP) to include an IP packet at the time of the IP connection in a UDP packet and also include characteristic information data related to the signal contents of the digital signal retrieved in a header field in the UDP protocol so as to send the IP packet and characteristic information data.

In the inventive analog signal input system, the analog signal is a voice signal and the characteristic information data is at least any one of a voice level, a sampling rate, and the number of bits per sample.

The present invention can also provides an analog signal output terminal described below.

The invention is an analog signal output system in which digital signals are sent from a host computer to an analog signal output terminal through a network and the analog signal output terminal converts the digital signals into analog signals and then outputs the analog signals; the analog signal output terminal has at least a network controller for controlling data transmission and reception, to which an Internet protocol (IP) connection is possible, a terminal-side IP connection establishing unit for establishing two connections, that is, an inbound socket connection and an outbound socket connection, to and from the host computer, a control signal processing unit for receiving control signals related to at least a start request and a stop request from the host computer, a signal receiving unit for receiving digital signals according to the control signals, a D/A converter for converting the digital signals into analog signals, and an output unit for outputting the analog signals.

The host computer has at least a network adapter for controlling data transmission and reception, to which an IP connection is possible, a host-side IP connection establishing unit for establishing two connections, that is, an inbound socket connection and an outbound socket connection, to and from the analog signal output terminal, a control signal processing unit for sending control signals related to at least a start request and a stop request to the analog signal output terminal, an application processing unit for executing an application and causing the application to generate digital signals, a signal transmitting unit for sending the generated digital signals, and an IP connection disconnecting unit for disconnecting the inbound socket connection and the outbound socket connection.

In the inventive analog signal output system, the terminal-side IP connection establishing unit in the analog signal output terminal establishes an inbound socket connection to the host computer when an outbound socket connection from the host computer is detected, and the host-side IP connection establishing unit in the host computer establishes an outbound socket connection to the analog signal output terminal.

In the inventive analog signal output system, the analog signal output terminal has a buffer area and data requesting unit; the data requesting unit sends a data transmission request signal according to the storage capacity of the buffer area; the signal transmitting unit in the host computer sends digital signals according to the transmission request signal.

A speaker is provided on the analog signal output terminal; the output signals from the output unit are generated as output signals as voice from the speaker, enabling voice to be output through the network.

In the invention, the network is a wireless communication network; the controller and network adapter are compatible with the wireless communication network.

The invention provides an arrangement in which the network uses the user datagram protocol (UDP) to include an IP packet at the time of the IP connection in a UDP packet and also include characteristic information data related to the signal contents of the digital signal retrieved in a header field in the UDP protocol so as to send the IP packet and characteristic information data.

In the inventive analog signal output system, the analog signal is a voice signal and the characteristic information data is at least any one of a voice level, a sampling rate, and the number of bits per sample.

In the inventive analog signal output system, the analog signal output terminal has a buffer with a prescribed capacity, which is used to store the digital signals received by the signal receiving unit; the analog signal output terminal also has at least a monitoring unit for monitoring the amount of digital signals stored in the buffer or the remaining capacity of the buffer and a synchronization control unit for changing a sampling clock in the D/A converter according to the either the amount of digital signals stored or the remaining capacity; the analog signal output by the output unit is then synchronized.

The invention, in which the analog signal output system has two or more analog signal output terminals for one host computer, provides a technology by which two or more types of voice data, including right and left stereo channel voice data, are output to each analog signal input terminal and by which voice outputs from the two or more analog signal output terminals are mutually synchronized by the function of the synchronization control unit.

In the inventive analog signal output system, a remote operation terminal for remotely operating an output mode from the analog signal output terminal is provided on the network; the host computer and remote operation terminal are interconnected through an operation socket that is different from the above two connections, that is, the inbound socket connection and outbound socket connection; when the remote operation terminal sends a remote operation signal to the host computer, the network adapter in the host computer receives the remote operation signal and then the control signal processing unit sends a control signal according to the remote operation signal.

According to the means described above, an analog signal input terminal that converts received analog signals to digital signals and sends the digital signals to a host computer via a network is used, and digital signals generated in the host computer are sent to the analog signal output terminal through the network to have the analog signal output terminal convert the digital signals into analog signals and output them, enabling voice, measured data, and the like to be transmitted in real time even between remote sites. Furthermore, since a synchronization control mechanism is provided, phase discrepancies do not occur even in stereo voice.

BRIEF DESCRIPTION OF THE SEVERAL VIEWS OF THE DRAWINGS

FIG. 12 illustrates the structure of voice data.

DESCRIPTION OF THE PREFERRED EMBODIMENTS

Preferred embodiments of the present invention will be described with reference to the drawings. The embodiments of the present invention are not limited to the following, but can be varied as appropriate.

Figure 1:
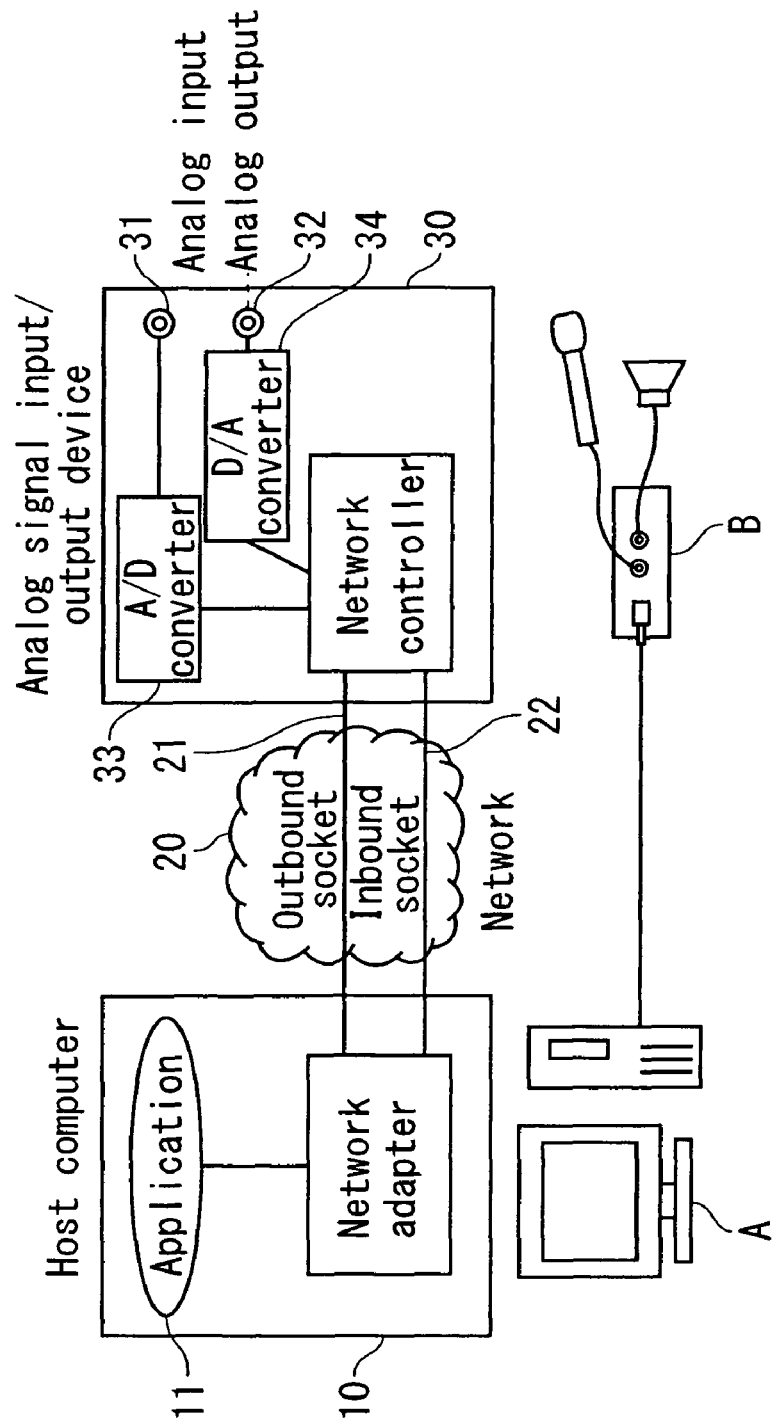
FIG. 1 shows the entire structure of an analog signal input/output system according to the present invention.

FIG. 1 shows the entire structure of an input/output system for analog signals according the present invention (the system is referred to below as this system).

This system comprises a host computer 10 and an analog signal input/output device 30 that is a terminal capable of performing communication through a network 20. The host computer executes an application 11 that performs desired processing by using analog signals received and output.

The interface of the network uses a transmission control protocol/Internet protocol (TCP/IP) socket method. Two sockets are provided; an outbound socket 21 specific to outbound information and an inbound socket 22 specific to inbound information. The direction from the host computer to the analog input/output device is the outbound direction, and the reverse direction is the inbound direction.

The analog signal input/output device 30 has an analog signal input terminal 31 and analog signal output terminal 32, which are connected to an A/D converter 33 and D/A converter 34, respectively, in the analog signal input/output device 30.

The host computer 10 is preferably a personal computer A. The analog signal input/output device 30 is configured as a dedicated unit B; the unit may be included in a communication device such as a router or in a device that inputs and outputs analog signals such as a measuring instrument, speaker, or microphone.

The network 20 may be of any type if it can use the TCP/IP socket method, but the Internet and wired and wireless local area networks (LANs) are preferable.

In this system, the analog signal input system and the analog signal output system can be configured separately, according to the usage purpose.

First Embodiment

In an arrangement disclosed below, a speaker and a microphone are provided on the analog signal input/output device 30; voice reproduced by the personal computer is output from the speaker: voice is input from the microphone and used on the personal computer.

Figure 2:
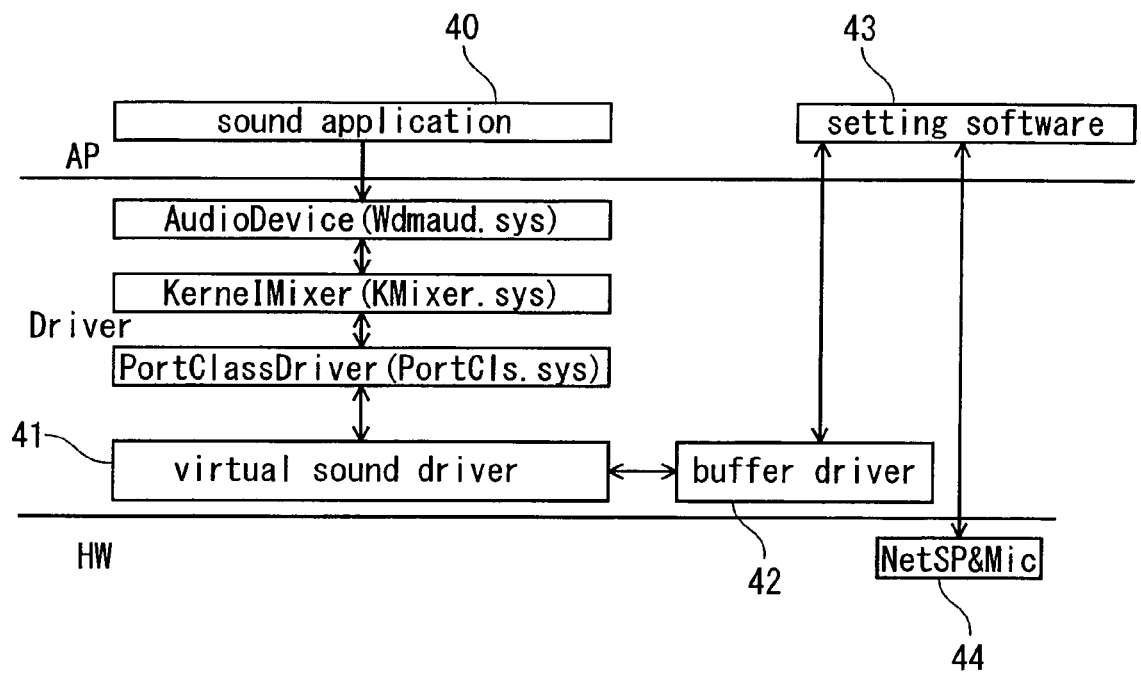
FIG. 2 illustrates the functions among the modules in the system according to the present invention.

FIG. 2 illustrates the functions of the hardware modules and software modules.

On the personal computer, a virtual sound driver 41 receives various settings, commands, and data sent from a high-order application 40 being executed to a sound driver; they are then stored temporarily in a buffer driver 42; setting software 43 accesses the buffer driver 42 and inputs and outputs necessary data to and from the analog signal input/output device.

The virtual sound driver transmits and receives data to and from the buffer driver through data input/output functions, in response to commands for reproduction, recording, stopping, and other operations as well as various settings.

The buffer driver is configured as a simple driver having a wave data storage area, a data input/output function (IOCTL), and an event notification feature to compensate for the inability of the virtual sound driver and setting software to directly input and output data.

The setting software is an application which, upon receipt of a notification from the buffer driver, acquires data necessary for reproduction and recording according to the state change and carries out communication with the analog signal input/output device.

Figure 3:
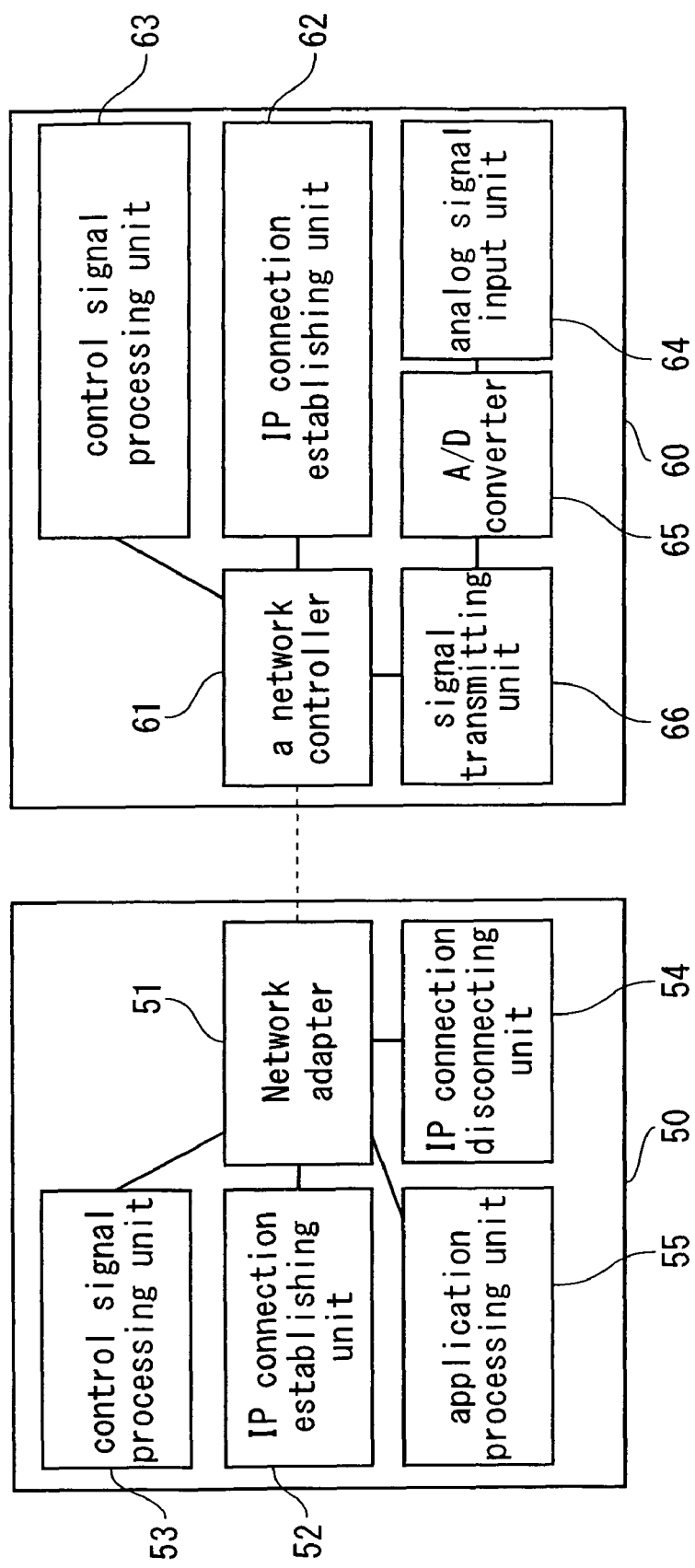
FIG. 3 shows the structure of an analog signal input system according to the present invention.
Figure 4:
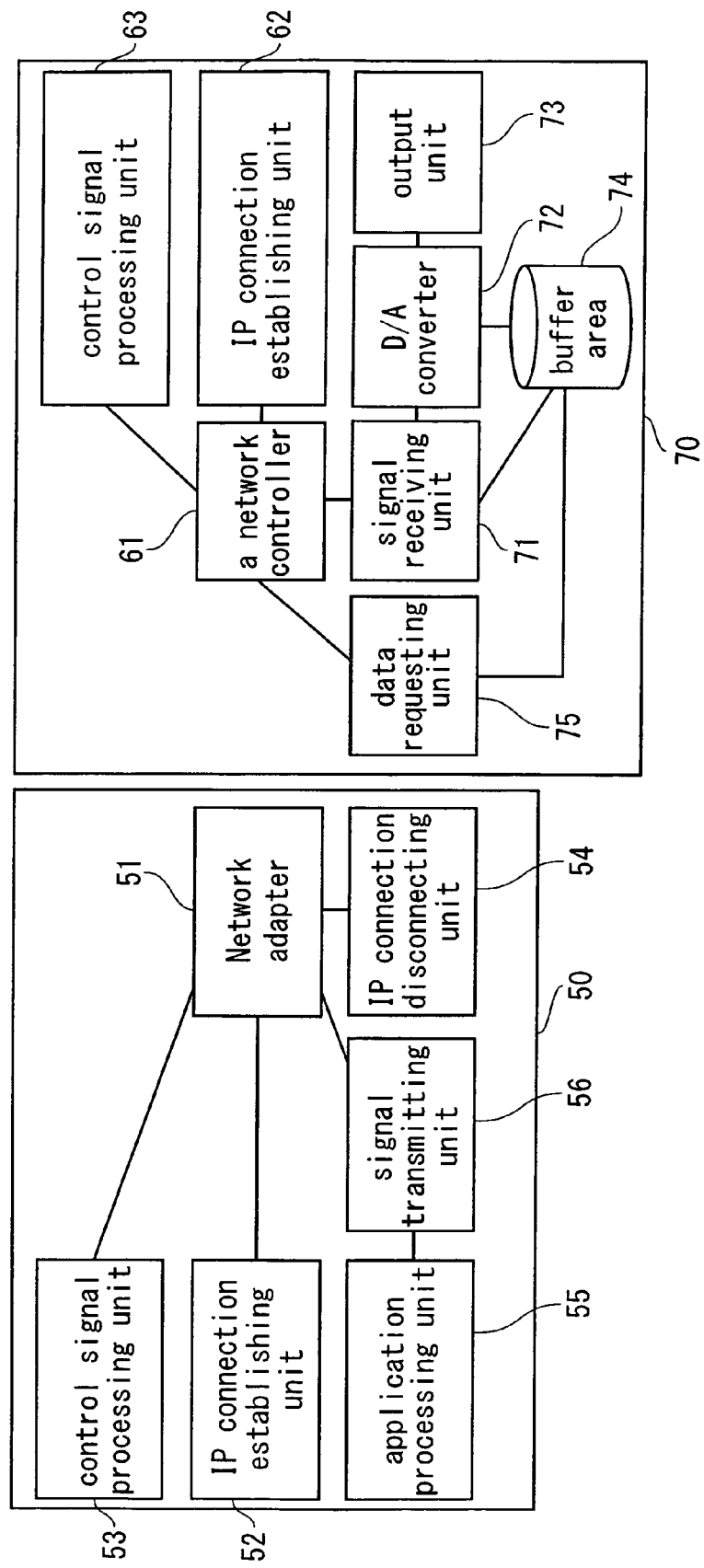
FIG. 4 shows the structure of an analog signal output system according to the present invention.

FIGS. 3 and 4 show the structures of an analog signal input system and analog signal output system, respectively, according to the present invention. These systems are shown separately for a better understanding of the input and output structures. In the actual embodiment, however, they are combined into one.

In the input system shown in FIG. 3, the personal computer 50 has a network adapter 51 connected to the network and also includes an IP connection establishing unit 52 on the host side, a control signal processing unit 53, an IP connection disconnecting unit 54, and an application processing unit 55, centered around the network adapter 51.

The IP connection establishing unit 52 establishes two connections, an inbound socket connection and an outbound socket connection, to and from an analog signal input device 60. The control signal processing unit 53 sends control signals to the analog signal input device, as described in detail below. The IP connection disconnecting unit 54 disconnects the inbound socket connection and outbound socket connection after input has been completed.

The application processing unit 55 performs software processing for the sound application 40, virtual sound driver 41, buffer driver 42, and setting software 43 which are shown in FIG. 2. The network adapter 51 comprises a known LAN card and its driver software. The other processing units 52 to 55 use the CPU mounted in the personal computer as well as a memory, peripheral storage unit, or other units that operate in conjunction with the CPU to perform processing.

The analog signal input device 60 has a network controller 61 connected to the network and also includes an IP connection establishing unit 62 on the terminal side, a control signal processing unit 63, an analog signal input unit 64 for accepting analog signals, an A/D converter 65 for converting the analog signals into digital signals, and a signal transmitting unit 66 for transmitting digital signals according to a control signal, centered around the network controller 61.

The network controller 61 has an IP connection with the above-mentioned network adapter 51. Both the network controller 61 and IP connection establishing unit 62 comprise, for example, known IC circuits. The control signal processing unit 63 receives a control signal from the host computer to control signal transmission by the signal transmitting unit 66.

A microphone is connected to the analog signal input unit 64; analog input signals from the microphone are converted into digital signals. Since A/D conversion technique is known, it can be practiced with ease by using, for example, a dedicated IC chip.

In the output system shown in FIG. 4 as well, the personal computer 50 has a network adapter 51 connected to the network and also includes an IP connection establishing unit 52 on the host side, a control signal processing unit 53, an IP connection disconnecting unit 54, and an application processing unit 55, centered around the network adapter 51. The components in the output system that are identical to the counterparts in the above input system are indicated by the same reference numerals.

The IP connection establishing unit 52 establishes two connections, an inbound socket connection and an outbound socket connection, to and from the analog signal output device 70. The control signal processing unit 53 sends control signals to the analog signal output device, as described in detail below. The IP connection disconnecting unit 54 disconnects the inbound socket connection and outbound socket connection after input has been completed.

The analog signal output device 70 has a network controller 61 connected to the network and also includes an IP connection establishing unit 62 on the terminal side, a control signal processing unit 63, a signal receiving unit 71 for accepting digital signals from the personal computer, a D/A converter 72 for converting the digital signals into analog signals, and an output unit 73 for outputting the analog signals, centered around the network controller 61.

It is also possible to provide a buffer area 74 and data requesting unit 75 for buffer control.

A speaker is connected to the output unit 73, so data reproduced by the sound application 40 in the personal computer 50 can be output as voice.

Figure 5:
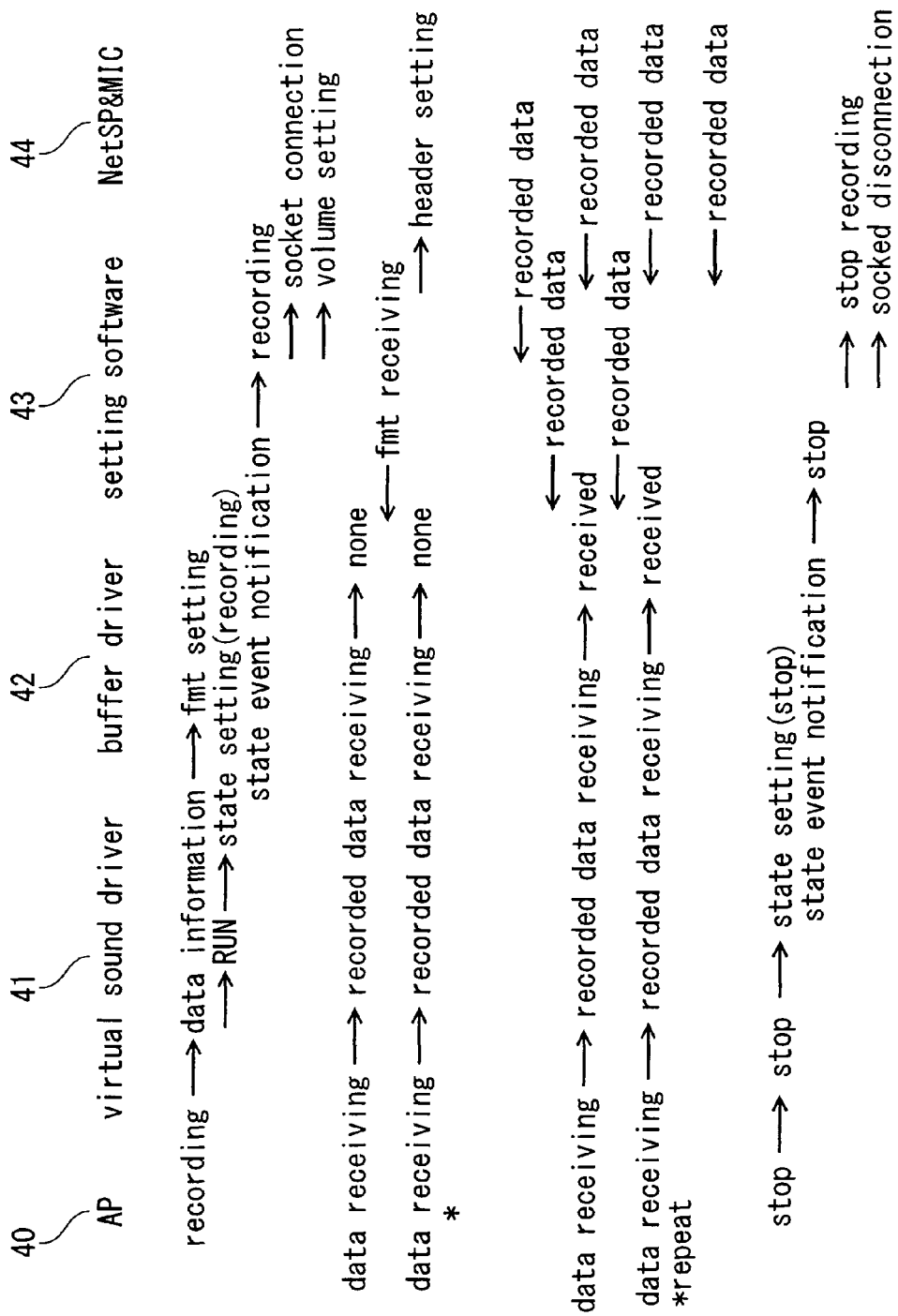
FIG. 5 shows an operation sequence indicating the flow of data during recording.
Figure 6:
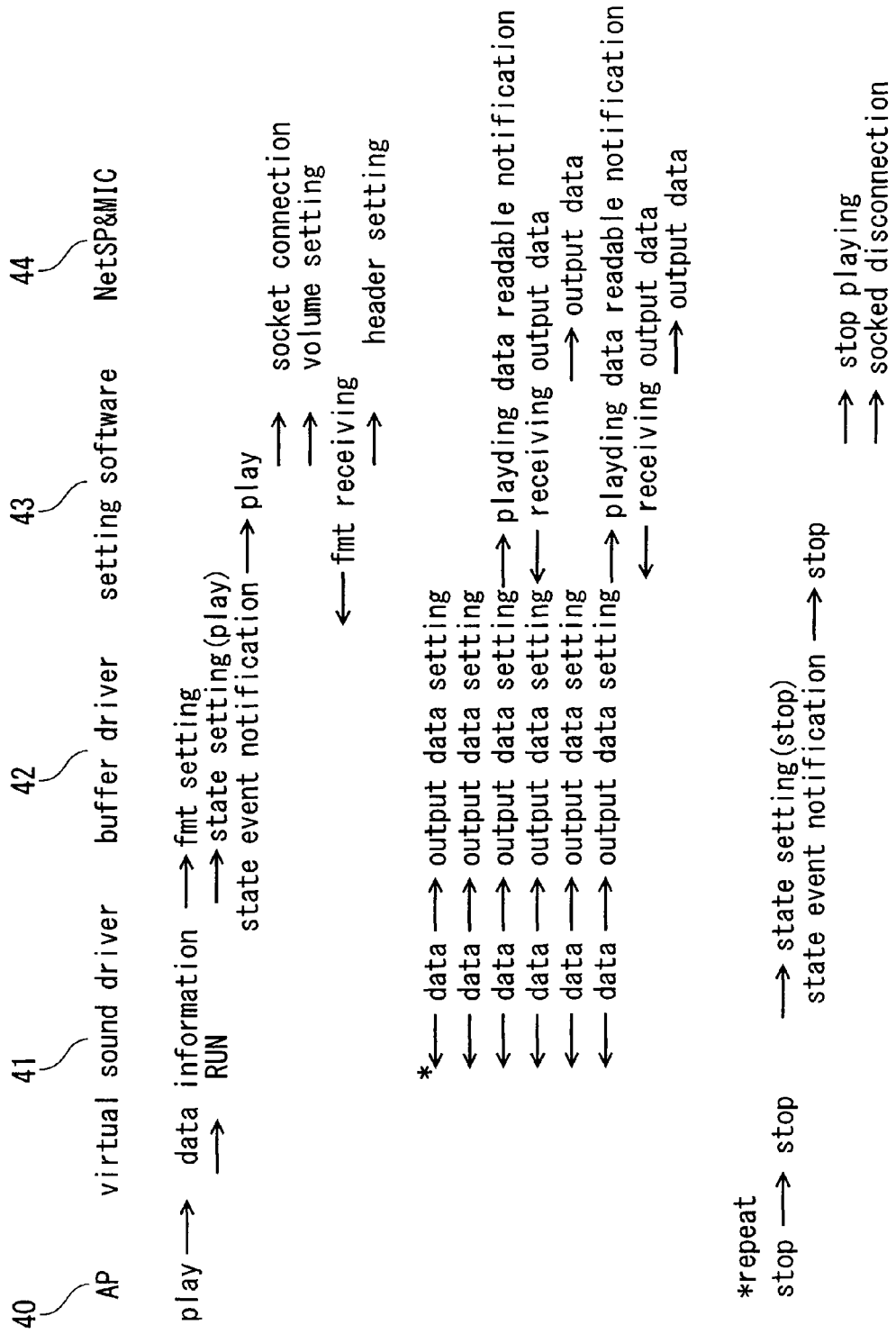
FIG. 6 shows an operation sequence indicating the flow of data during reproduction.

Next, processing by the application processing unit 55 will be described. FIG. 5 shows an operation sequence of the sound application 40, virtual sound driver 41, buffer driver 42, and setting software 43 when voice is input from the microphone 44 and recorded by the sound application 40. FIG. 6 also shows an operation sequence of the sound application 40, virtual sound driver 41, buffer driver 42, and setting software 43 when voice data is generated by the sound application 40 and output from the speaker 44.

As illustrated in FIG. 5, when the sound application 40 starts recording processing, the data information used by the sound application is passed from the virtual driver 41 to the buffer driver 42. Format setting and setting processing (fmt setting and display) for data transfer are then carried out. In this embodiment, format setting functions passed to the buffer driver include a wave format pointer, which is placed at the beginning, a representation format, channel information, a sampling frequency, the amount of data transferred, a block size, and the number of bits per sample.

RUN processing is performed as state notification processing when, for example, recording is started. At that time, a KSRUN_STATE function for reproduction or recording is sent. Whether the function is intended for reproduction or recording is discriminated by an argument. The buffer driver 42 sends a state event notification to the setting software upon occurrence of a state change in the buffer driver 42. Upon receipt of this event notification, the setting software 43 obtains the state from the buffer driver.

Other state notification processing includes KSSTOP_STATE (stop), KSPAUSE_STATE (temporary stop), and KSSTATE_ACQUIRE (resource having been acquired). After a setting has been made, processing is usually performed in the following sequence in reproduction or recording processing: KSPAUSE_STATE→KSRUN_STATE→KSSTOP_STATE.

During execution of RUN, a data transfer area that has been set is used to transfer reproduced or recorded data by a preset amount at preset time intervals.

Unlike ordinary sound devices, this system causes an incorrect data transfer timing because data transfer position and transfer interrupts are not supported by hardware. To prevent input/output data discontinuity due to the incorrect timing, the speed and the amount of data transferred are adjusted by, for example, the ratio of the contents of the buffer capacity provided in the buffer driver.

Figure 7:
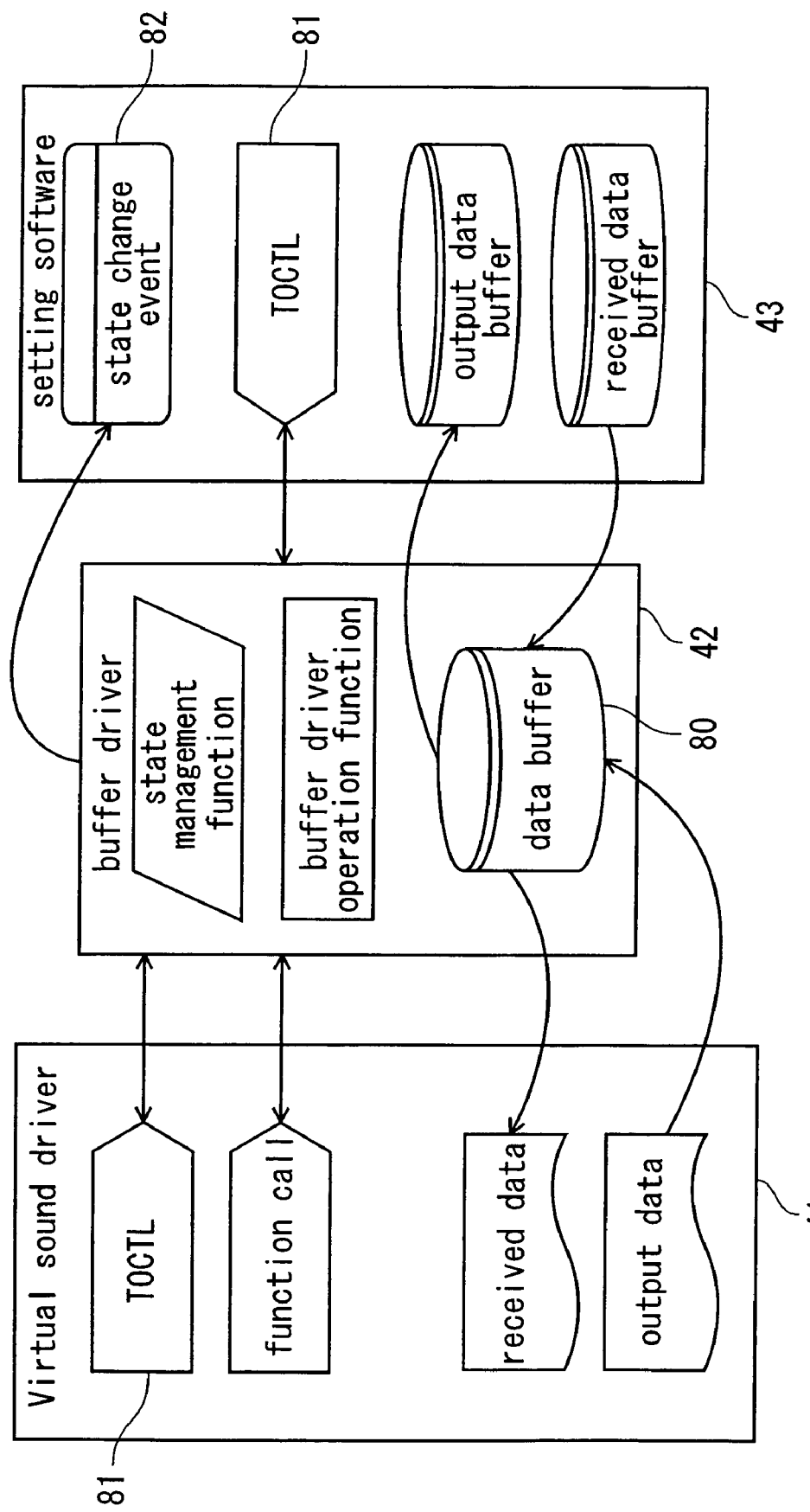
FIG. 7 illustrates buffer management in the analog signal input/output system according to the present invention.

FIG. 7 shows the structure of the buffer driver 42. The buffer driver 42 has an interface function used between the IOCTL 81 and the data buffer 80, which is a wave data storage area, and also has a notification function for reporting a state change event 82, so that data is transmitted and received between the virtual sound driver 41 and setting software 43. As described above, the setting software is notified of the state change event 82 through an event notification, according to the state change notification from the virtual sound driver. In buffer management, write points and read points in the virtual sound driver and setting software are controlled by flags.

The setting software 43 in this embodiment is created as an application that resides in the operating system when activated and performs packet communication with the analog signal input/output device 30 when a setting change is made by the graphical user interface (GUI) and an event notification is received from the buffer driver. A GUI screen processing program and an event notification receiving thread are always running.

The GUI can be used for setting IP addresses of devices, time-out periods during volume setting in reproduction and recording, and the number of retries.

This completes the description of the processing by the application processing unit 55. Next, a procedure for transmitting and receiving data to and from the analog signal input/output device 30 through the network 20 will be described.

In the present invention, two sockets, an outbound socket specific to outbound information and an inbound socket specific to inbound information, are provided between the personal computer 10 and analog signal input/output device 30. The outbound socket sends a command or data as an outbound message. A receiving port with a port number, for example, 47474 is provided on the analog signal input/output device 30.

Then, an inbound message is used to return a status as a response. The inbound socket sends a command or data as an inbound message. Then, an outbound message is used to return a status. A receiving port with a port number, for example, 41414 is provided on the personal computer 10.

These sockets are connected as follows: when the outbound socket is connected by the IP connection establishing unit 52 in the personal computer 10, the inbound socket is connected by the IP connection establishing unit 62 in the analog signal input/output device 30.

In the present invention, as described above, the inbound socket and outbound socket are connected independently. When the inbound socket and outbound socket are selectively used to send and receive data and commands as described below, therefore, stable signal input/output is achieved without data transfer congestion.

The inbound socket and outbound socket are disconnected by the IP connection disconnecting unit 54 in the personal computer 10.

Figure 8:
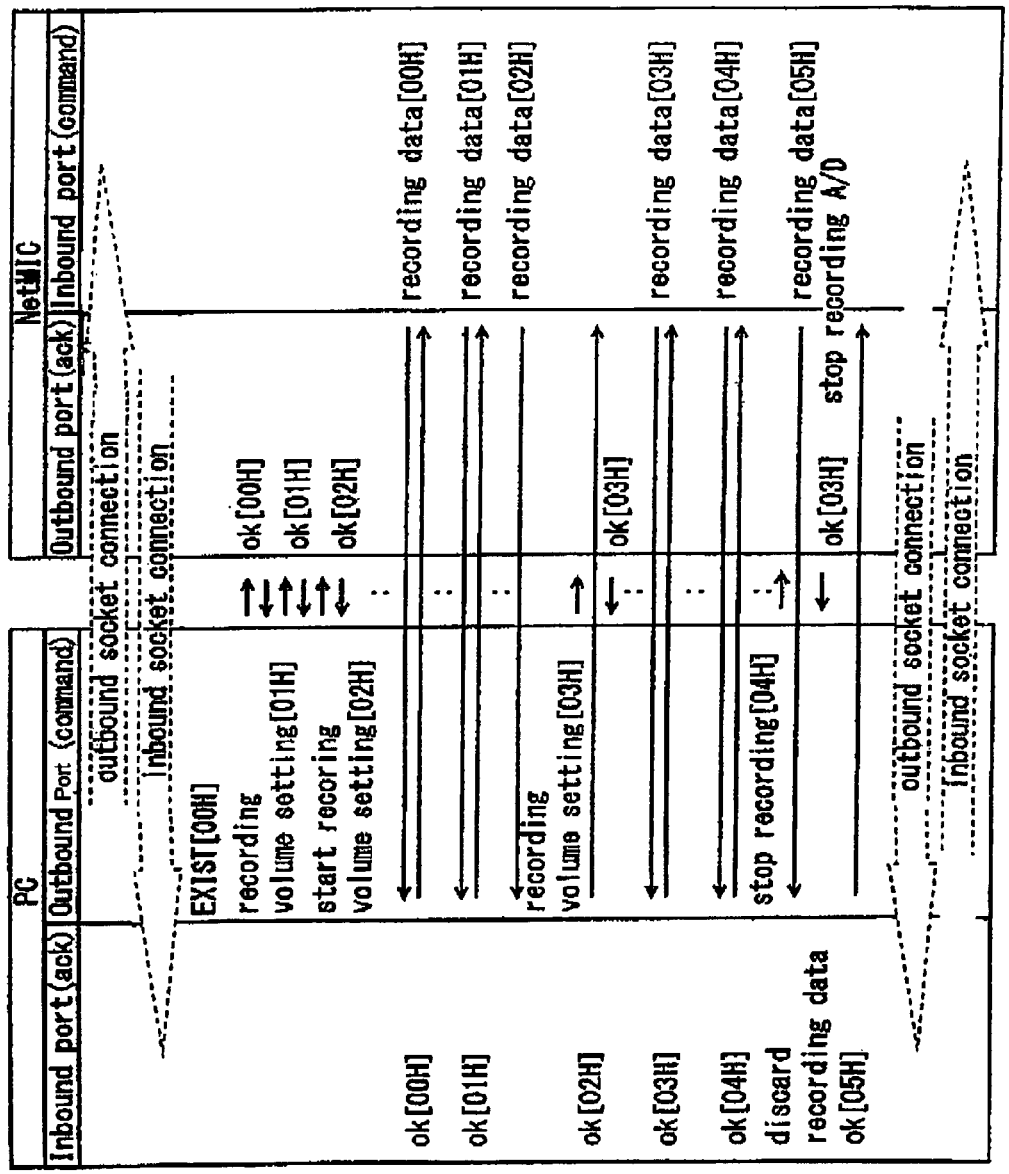
FIG. 8 illustrates a data transmission procedure during recording.

At the time of recording, the outbound socket is first used to send an EXIST command that checks for the presence or absence of the analog signal input/output device 30 and initializes it, as shown in FIG. 8. If the result is normal, the analog signal input/output device 30 returns a normal status. Similarly, a recording volume setting command and recording start command are sent and then the analog signal input/output device 30 returns a normal status.

These commands are all sent from the control signal processing unit 53 in the personal computer 10. The control signal processing unit 63 in the analog signal input/output device 30 performs response processing.

Upon receipt of the above recording start signal, an analog signal entered from the analog signal input unit 64, to which a microphone is connected, is converted by the A/D converter 65 into a digital signal. The digital signal then passes through the signal transmitting unit 66 and network controller 61 as recorded data and is transmitted over the inbound socket.

The data length of recorded data is set according to the data speed in the format setting described above. When the data speed is, for example, less than 16 Kbytes/s, the data length is set to 8,192 bytes; similarly, at data speeds of less than 32 Kbytes/s and 32 Kbytes/s or more, the data length is set to 16,384 bytes and 32,768 bytes, respectively. Data is waveform data that can be processed by the application.

Each time the application processing unit 55 in the personal computer 10 receives recorded data, it returns a normal or abnormal status over the inbound socket.

If, for example, a recording volume is set by the sound application 40 during this recording processing, a recording volume setting command is sent from the control signal processing unit 53 over the outbound socket. The command is processed by the control signal processing unit 63 in the analog signal input/output device 30 and a response is returned. The command is reflected in, for example, signal intensity adjustment by the analog signal input unit 64.

Upon the completion of recording, a recording stop command is sent over the outbound socket. Then, the A/D converter 65 and signal transmitting unit 66 are stopped according to a command received from the control signal processing unit 63. Data received after the recording stop command can be sent to the personal computer 10 and discarded by the application processing unit 55. Finally, after a normal status is sent to the analog signal input/output device 30 over the inbound socket, the inbound socket and outbound socket are disconnected.

Figure 9:
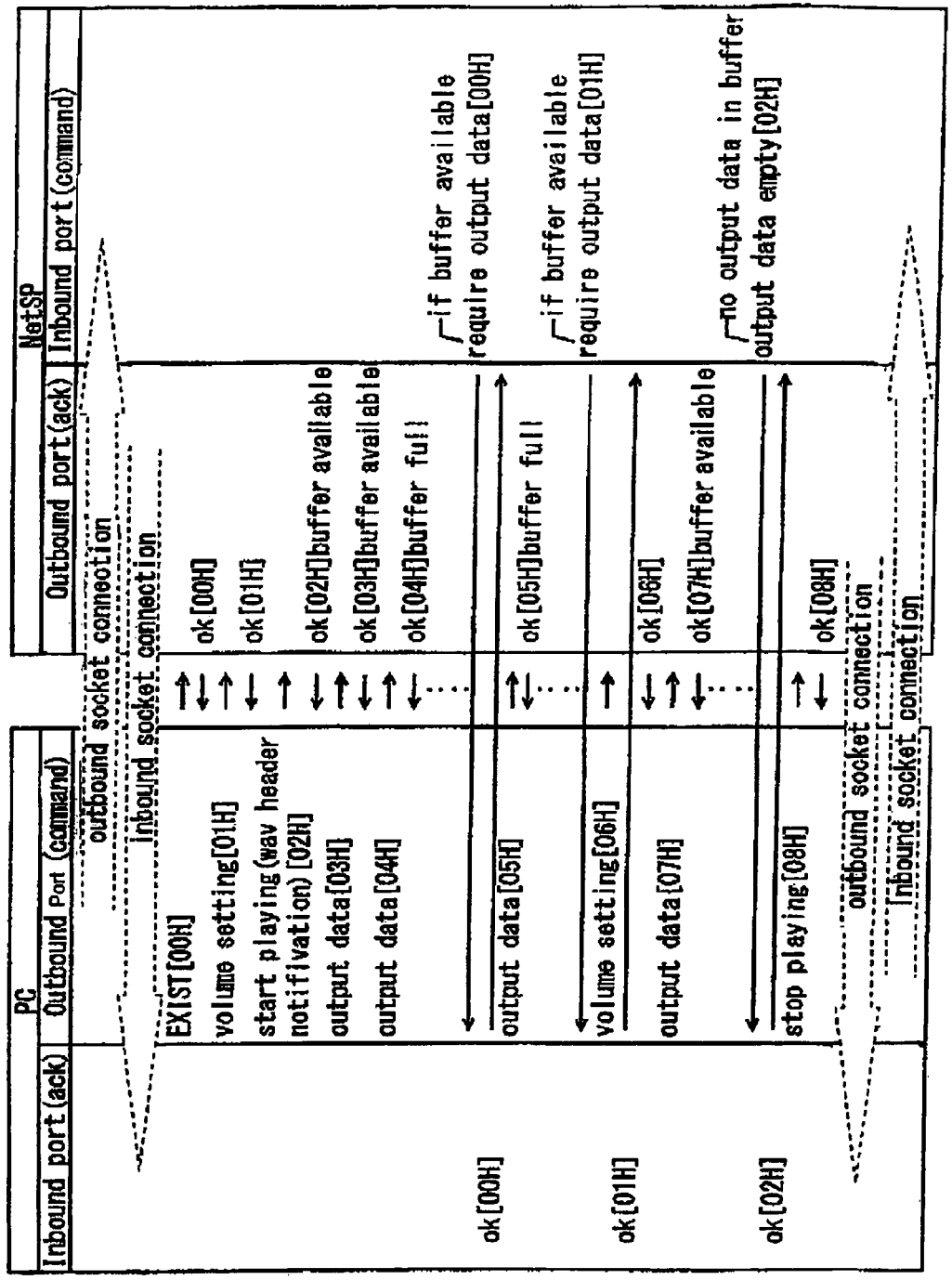
FIG. 9 illustrates a data transmission procedure during reproduction.

Next, a transmission procedure at the time of reproduction from the speaker will be described with reference to FIG. 9. In the present invention, a buffer area 74 and data requesting unit 75 can be provided in the analog signal output device, enabling continuous analog signal output.

When the sound application 40 starts reproduction processing, the outbound socket is used to send an EXIST command that checks for the presence or absence of the analog signal input/output device 30 and initializes it, as described above. If the result is normal, the analog signal input/output device 30 returns a normal status. Similarly, a reproduction volume setting command and reproduction start command are sent and then the analog signal input/output device 30 returns a normal status.

These commands are all sent from the control signal processing unit 53 in the personal computer 10. The control signal processing unit 63 in the analog signal input/output device 30 performs response processing.

Then, reproduced data of voice is sent to the analog signal input/output device 30 over the outbound socket. In the analog signal input/output device 30, digital data received by the signal receiving unit 71 is accumulated in the buffer area 74; at the same time, the digital data is converted by the D/A converter 72 into analog signals and the analog signals are output from the speaker connected to the output unit 73 as voice.

If there is an available space in the buffer area after reproduced data is received, the control signal processing unit 63 returns a normal status that indicates there is an available space in the buffer area. When the control signal processing unit 53 in the personal computer 10 receives that status, reproduced data from the application processing unit 55 is sent by the signal transmitting unit 56.

If the buffer area 74 is full of data and no more reproduced data can be accumulated in the buffer area, a normal status that indicates there is no available space is returned. When this happens, transmission from the signal transmitting unit 56 is suspended and the overflowing data is stored in, for example, the memory in the personal computer or an external storage device.

When data in the buffer area 74 is reduced as a result of voice output and an available space equal to or greater than the length of a reproduced data block is created in the buffer area, the data requesting unit 75 sends a reproduced data request command over the inbound socket. Upon receipt of the command, the control signal processing unit 53 returns a normal status over the inbound socket and commands the signal transmitting unit 56 to send reproduced data again over the outbound socket. This sequence is repeated so that voice is output while a predetermined amount of data is accumulated in the buffer area 74.

A reproduction volume setting command can be sent in the middle over the outbound socket. The analog signal input/output device 30 then returns a normal status.

If there is no reproduced data remaining in the buffer, the control signal processing unit 63 in the analog signal input/output device 30 sends a reproduced data empty command over the inbound socket. The reproduced data empty command indicates that there is no data remaining; if a reproduction stop command is not received and the empty state continues, the reproduced data empty command is sent repeatedly at 10-second intervals.

When stopping the reproduction, the personal computer 10 sends a reproduction stop command over the outbound socket. When the analog signal input/output device 30 responds with a normal status, the reproduction processing is terminated.

The present invention uses TCP/IP, so commands and data are assigned serial numbers so that correct orders are maintained during recording and reproduction and that a correct sequence of commands is assured. Specifically, each time an inbound or outbound message is sent, the transmitting side adds an ascending serial number. Since the serial number is used in the response status, the transmitting side is notified of the command that has been sent normally.

As described above, the present invention can use an analog signal input/output device connected to a host computer via a network to input and output any kind of analog signals to and from the host computer. When analog signal input/output devices are each assigned unique IP addresses, the host computer can freely select a desired analog signal input/output device just by specifying its IP address.

As described above, a microphone and speaker are typical devices that use analog signals. Since analog signals output from various types of sensors, measuring instruments, and the like are input, devices that have needed to be physically connected can be used.

In particular, when a wireless LAN, mobile phone line, personal handyphone system (PHS) line, or other network is used, the host computer and analog signal input/output devices can be disposed in desired positions.

For example, a standalone speaker with no speaker cord can be configured just by including the analog signal input/output device (particularly the output device) in a speaker and mounting a wireless LAN adapter on the network controller. If speakers of this type are disposed in a plurality of places in a home or the like, a speaker for output can be specified at any time from a single personal computer.

As described above, the present invention provides an extremely versatile input/output device. The device may be provided as an independent unit having analog input and output terminals and may also be integrally combined with another device that generates and outputs analog signals.

Second Embodiment

Figure 10:
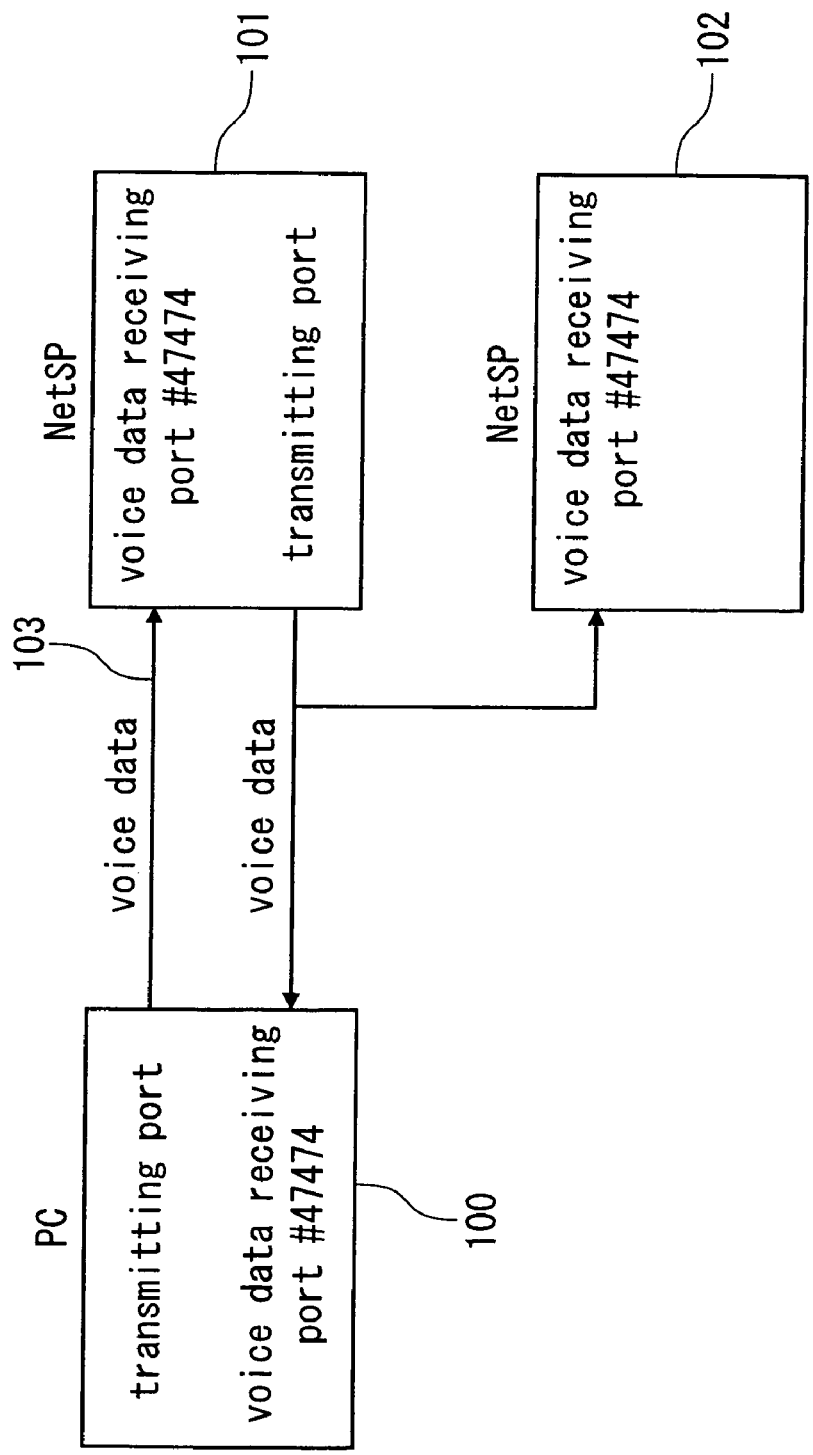
FIG. 10 shows the entire structure of an analog signal input/output system in a second embodiment in the present invention.
Figure 11:
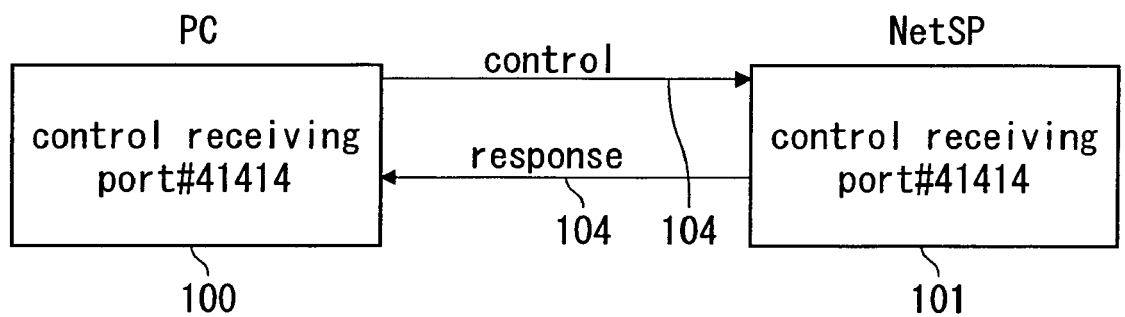
FIG. 11 illustrates sockets in the analog signal input/output system in the second embodiment in the present invention.

An arrangement for stereo voice input and output according to the present invention will be described below. FIG. 10 shows sockets 103 with a port number 47474 for voice data transmitted and received between a host computer 100 and two analog signal input/output devices 101 and 102. In the present invention, another socket 104 with the port number 41414, as a dedicated socket for control, is provided separately from the sockets for voice data so as to enable control signals and response signals to be transmitted and received, as shown in FIG. 11. The control signals include signals for a search for the analog signal input/output device on the network, for starting recording, and for stopping recording. The response signals include responses to the above search, the starting of recording, and the stopping of recording.

The User Datagram Protocol (UDP) is used as the transport protocol.

In the UDP protocol, an IP packet is included in a UDP packet. A standard UDP packet header includes a source port number, a destination port number, a message length, a checksum, and data. In practice, there is no significant difference between the UDP packet and IP packet.

In this embodiment, the UDP protocol is used to send, by including in the header, a volume, a voice level, a sampling rate, the number of bits per sample, and other characteristic information required for reproduction or recording. Accordingly, benefits resulting from the use of the high-end protocol for IP packets are provided; for example, a quick response to modification of voice data output from the personal computer is made possible.

FIG. 12 shows the structure of voice data. A first one byte is a command indicating voice data, followed by the number of channels (monophonic or stereophonic) represented by one bit, the number of bits per sample, a volume, a sampling rate, and a data length in that order, as shown in the drawing. Finally, PCM data for one frame is sent.

In this embodiment, one frame of PCM data is data for 10 ms, but not fixed to this length. If the data length exceeds 512 bytes, the data is sent in a plurality of packets with the maximum packet length being 512 bytes. When the data length is 888 bytes, with an 882-byte frame and a 6-byte header, for example, the data is sent in two packets; the first packet is 512-byte long and the second packet is 376-byte long. When transmission is directed to the right and left channels, the first packet and the second packet are sent sequentially in that order.

Figure 13:
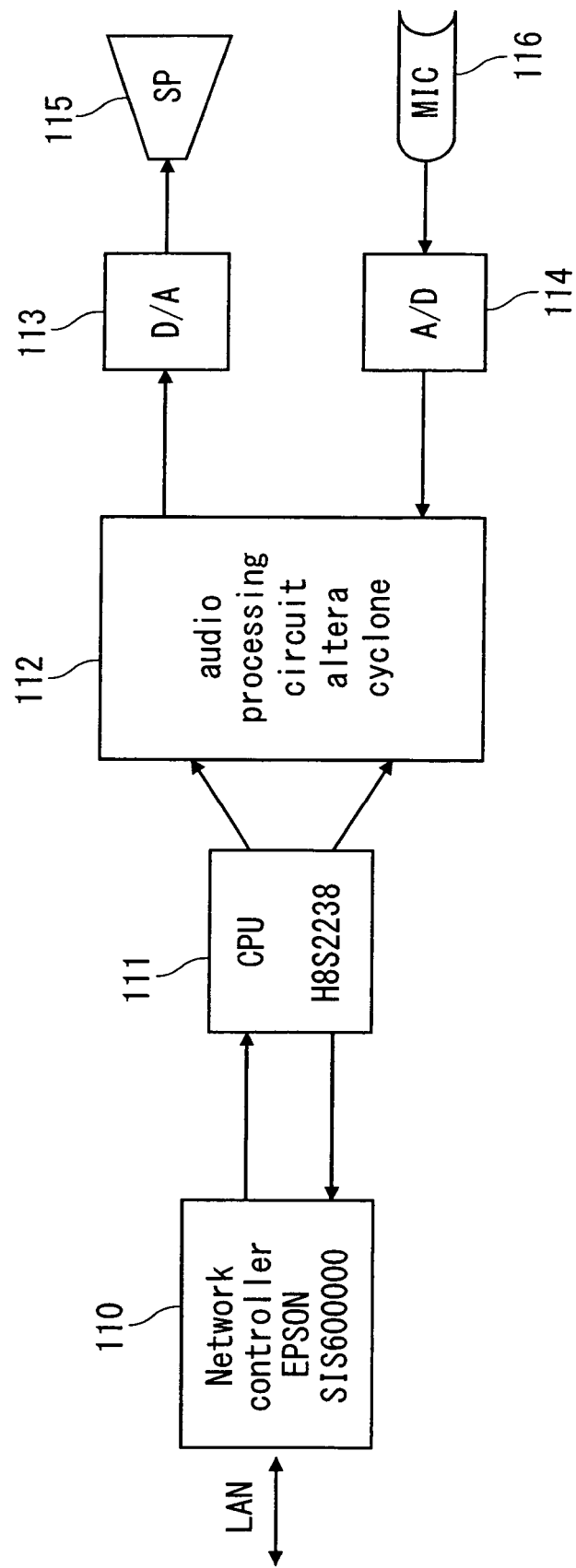
FIG. 13 is a block diagram of the analog signal input/output system in the second embodiment of the present invention.

FIG. 13 shows the entire structure of the analog signal input/output device 101. The analog signal input/output device 101 has a network controller 110 connected to a LAN, the Internet, or another network, a CPU 111, a voice processing circuit 112, a D/A converter 113, and an A/D converter 114. A speaker 115 and microphone 116 are also attached. The speaker 115 and microphone 116 may be connectable though external terminals, instead of being attached.

The CPU 111 is responsible for data transmission between the LAN and voice processing circuit 112 and device state management. The voice processing circuit 112 is responsible for voice data buffering, D/A and A/D conversion control, synchronization control, and volume control, as described below.

After writing voice data into the voice processing circuit 112, if the data is valid, the CPU 111 terminates the processing by writing in succession a state (discrimination of left channel reproduction, right channel reproduction, the starting of recording, the stopping of recording, etc.), a frame length, a sampling rate, the number of channels, the number of bits, and a volume, and, finally, setting a flag (a prescribed bit string) indicating the data is valid.

Figure 14:
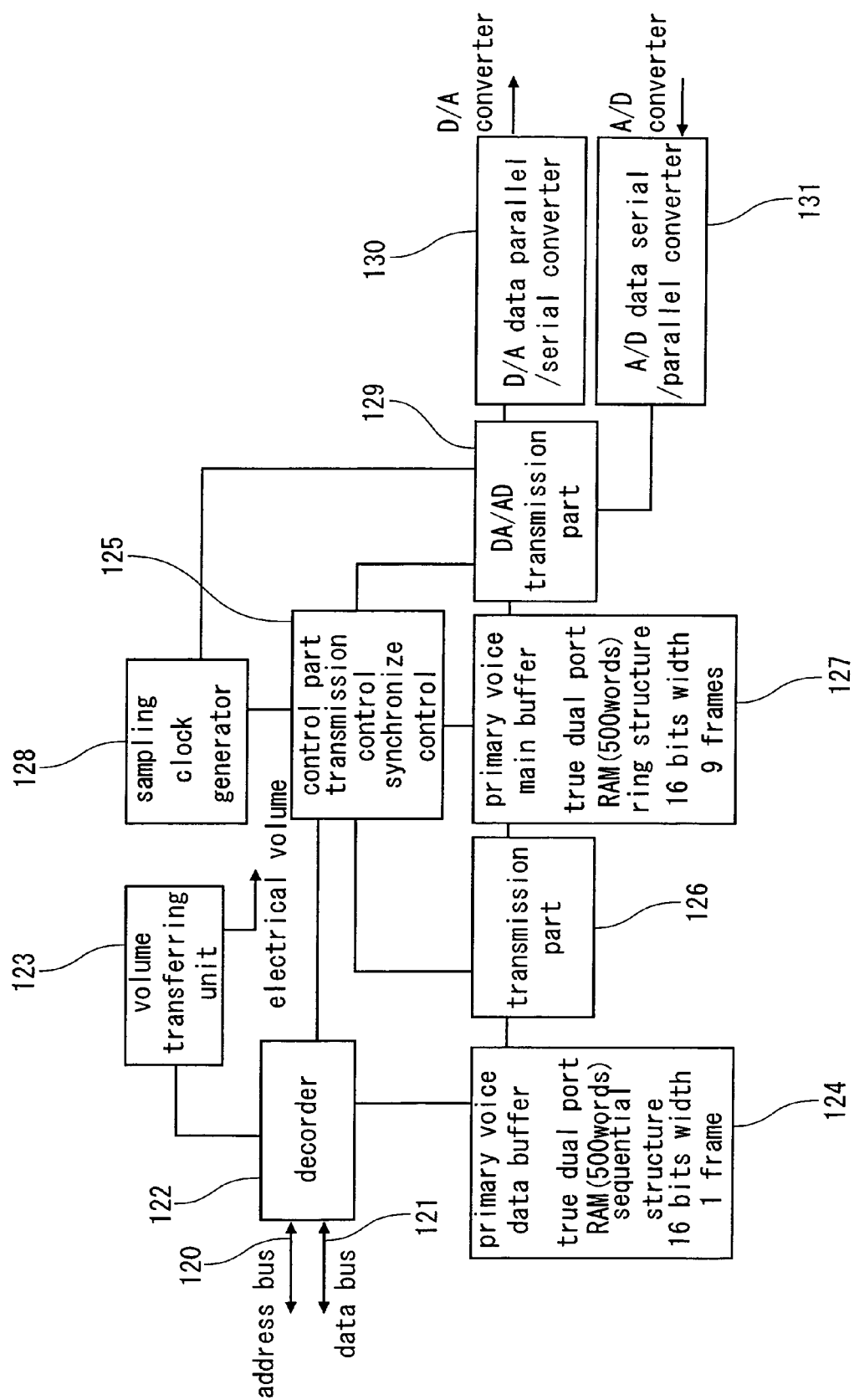
FIG. 14 is a block diagram of a voice processing circuit in the second embodiment of the present invention.

FIG. 14 shows a block diagram that indicates the structure of the voice processing circuit 112. A decoder 122 connected to the CPU 111 via address buses 120 and 121, which are physical signal lines, retrieves the above control signals and voice data and transmits them to a volume transferring unit 123, a primary voice data buffer 124, and a controller 125. In the volume transferring unit 123, an electronic volume control (not shown) changes a reproduced volume according to volume control information.

The voice data is continuously transferred from a primary buffer 124 through a transferring unit 126 to a main buffer 127.

Although the data stored in the main buffer 127 has been conventionally converted directly from digital to analog and output, a novel synchronization mechanism is provided in the present invention. The host computer and the voice input/output devices each have a different clock source. In the analog signal input/output device 101 as well, a sampling clock generator 128 oscillates a specific clock. In particular, the virtual sound driver in the host computer (personal computer) uses a software timer to create data processing cycles, so there is large error. Data speeds even at the same sampling frequency differ slightly, possibly causing discontinuous sound and increasing a phase shift between the right and left stereo channels. To address this problem, the present invention has achieved synchronization control by adjusting the data speeds to the data speed on the transmitting side.

Specifically, lower and upper thresholds are preset for the amount of remaining data in the main buffer 127. The controller 125 checks and retrieves the remaining data amount for each valid data indicating signal described above.

If the remaining data amount falls below the lower threshold, the controller 125 performs control so that the sampling clock is decreased by one step and then transmission is performed from a DA/AD transmitting unit 129 through a D/A data parallel/serial converter 130 to the D/A converter 113.

If the upper threshold is exceeded, the sampling clock is increased by one step and transmission is performed similarly. If the amount of remaining data is returned to within the appropriate range, control is performed so that the sampling clock is returned to the original clock.

When the sampling clock is at 44,100 Hz, for example, if the system clock generated by the sampling clock generator 128 is at 45.1584 MHz, the 44,100-Hz frequency is usually obtained by dividing the system clock frequency by 512×2 cycles. In control for lowering the frequency by one step, the system clock frequency is divided by 513×2 cycles, resulting in 44,014 Hz. In control for increasing the frequency by one step, the system clock frequency is divided by 511×2 cycles, resulting in 44,186 Hz.

The variable ratio of the sampling clock is only about 0.2%, which does not largely affect the sound quality. Accurate synchronization is achieved as much as possible by minimizing the difference between the upper and lower thresholds (reducing the difference to about one frame).

The data valid signal is issued by the CPU 111 after voice data for one frame has been written. However, the voice data includes fluctuating components such as collision delays and processing delays by the task switch and LAN card in the host computer and the driver. If the remaining data amount described above is determined only in one decision, the measurement result is not accurate due to the large effect by the fluctuating components.

To reduce the effect by the fluctuating components, when the remaining amount of data is retrieved, an average of the last 32 measurements is used as the amount of currently remaining data.

These measurements are performed by the controller 125. The controller 125 stores the last 32 measurements and calculates an average.

The synchronization mechanism described above assures that the amount of remaining data is always fixed even for stereo voice, making the speeds of the outputs from the voice input/output devices equal to the speed on the transmitting side. As a result, phase synchronization is established, eliminating the need to perform phase control separately.

The initial phase difference is determined according to processing time differences caused by unicasting for a plurality of voice input/output devices and mainly to differences in time taken to transmit to the Ethernet (trademark). At a frequency of 44,100 Hz, for example, suppose that data for one frame is sent in two packets, the first packet being 512-byte long. Then, the time difference when the 512-byte packet is unicasted is 41 μs (512×8/100,000,000) for 100Base-TX; if transmission to the Ethernet and delays to prevent collision are considered, the time difference is about 50 μs. The phase difference between the right and left channels is 50 μs, equivalent to an acoustic velocity of 1.7 c/m. Therefore, the initial phase difference can be reduced to a degree at which there is no problem when the speakers are disposed in a usually way.

Since the reproduction speeds are synchronized by the synchronization control mechanism as described above, voice outputs from a plurality of voice input/output devices are synchronized with the initial phase difference left unchanged. Environments for 5.1-channel, 6.1-channel, and 7.1-channel speakers, in which stereo voice output and surround environments are achieved, can be configured exactly in the same way.

The main buffer 127 has a minimum required capacity (about four frames) as shown in the drawing. This minimizes the delay and thereby enables linkage with real-time applications and other devices.

This embodiment uses Power Over Ethernet (PoE) to supply power to the analog signal input/output device 101 so that it can be disposed easily. Also, to simplify settings, the analog signal input/output device is designed so that it responds with it address and other information when the host computer searches for it on the LAN. The speakers are listed in a group setting GUI (for right and left speaker settings) in a transfer application. The GUI enables the setting of output destination, information about the right and left speakers, volume, and the like just by selecting from the list.

The analog signal input/output device can also send voice entered from the microphone to the network, as described above. When the receiver is the host computer, the voice is handled as an input that has been passed through a virtual sound device, as in the case of output. Accordingly, the voice can be used as a voice input to various applications. It is also possible to use the device on the receiving side as another voice input/output device (for example, 102) without the host computer being passed through. In this case, the terminal on the receiving side receives voice by the same method described above. A system for interphones can also be configured just by connecting simple devices of this type to a LAN.

Third Embodiment

Figure 15:
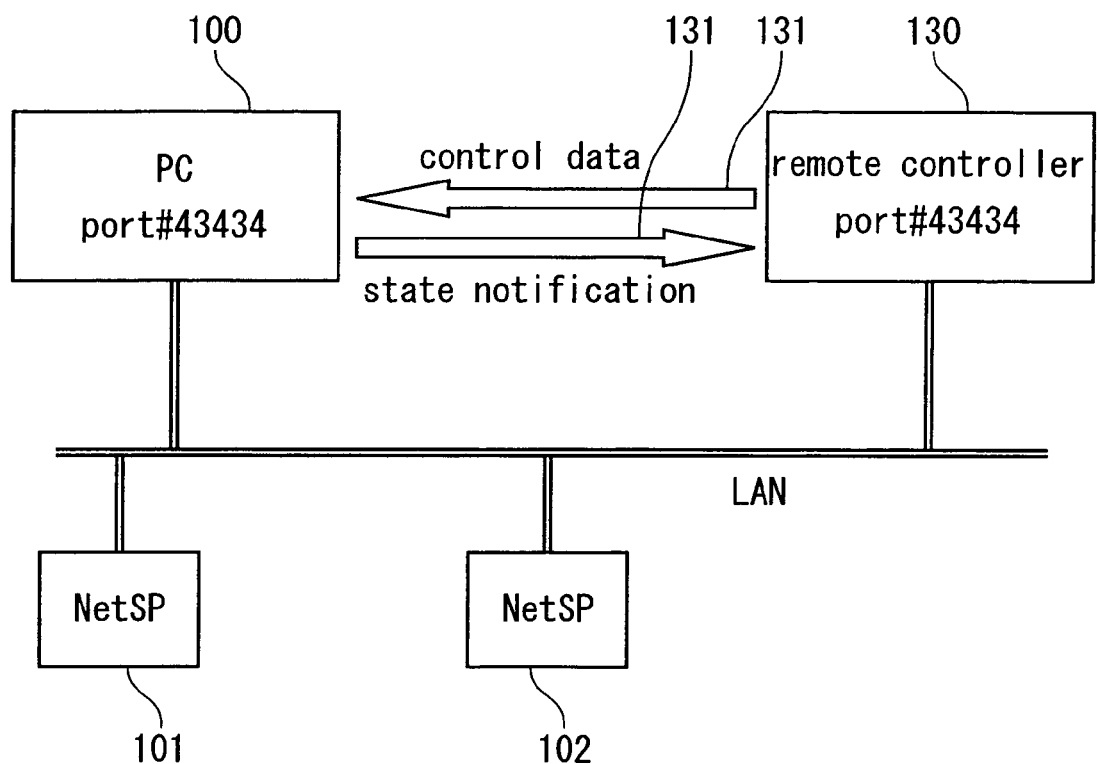
FIG. 15 shows the entire structure of an analog signal input/output system in a third embodiment of the present invention.

FIG. 15 shows an arrangement in which a remote control terminal 130 is provided on the network to control the host computer 100.

In addition to the socket specific to voice data and the socket specific to control described above, this arrangement further uses an operation socket for remote control. The operation socket is connected based on TCP; it uses a port number 43434, for example.

The remote control terminal 131 has a speaker selecting switch and volume changing switch; when the speaker selecting switch is pressed, specification information about a voice input/output device is sent to the host computer; when the volume changing switch is pressed, volume setting information is sent to the host computer. The information sent by the switches is a bit string comprising a command and a data length as well as information about the name of a voice input/output device to be activated or a volume setting value. The information is sent from a known network adapter through the network.

In the host computer, the network adapter receives the information, and the control signal processing unit sends a control signal according to the received information.

The remote control terminal can select an output destination and adjust the volume at an appropriate place, independently of the voice input/output device and host computer, so the remote control terminal is particularly useful when used in conjunction with the voice input/output device according to the present invention.

The remote control function can also be attached to the voice input/output device. In this case, control which has been performed by the host computer can be specified from a desired voice input/output device. When the user moves from a room to another room, for example, the output destination can be changed to the voice input/output device in the other room. In particular, the remote control function can be preferably combined with the arrangement for interphones described above, in which case an output can be directed directly to a desired terminal.

Furthermore, an infrared light receiving element is attached to the voice input/output device, the host computer, or the remote operation terminal described above so that remote operation can be performed from an infrared remote control.

Another Embodiment

In the above embodiments, arrangements using wired and wireless LANs and the Internet have been disclosed. A preferable arrangement will be obtained by using IEEE 802.11e compatible wireless LANs. According to the standard, Quality of Service (QoS) is achieved, so packet fluctuations described above are eliminated. Since averaging processing is thereby not necessary, more complete synchronization and phase synchronization become possible.

A wireless universal serial bus (USB) may be used for short-distance signal transmission. The present invention is not necessarily limited to voice; it can be applied to input and output of all types of analog signals. Accordingly, the arrangement may be such that signals are transmitted and received to and from peripheral units over a USB.

Examples of analog signals that can be used in the present invention include analog signals, signals for adjusting the illumination intensity of lamps and the temperatures of heating wires, and arbitrary signals actuated by time-series harmonics.

Although PoE is used in the second embodiment to supply power, any power supply method can be used. If solar cells are used in conjunction with a wireless LAN, a completely wireless voice input/output device can be provided.

What is claimed is:

1. An analog input system that uses an analog signal input terminal to convert an analog signal into a digital signal and send the converted digital signal to a host computer via a network, wherein
    the analog signal input terminal comprises at least: an analog signal input unit;
    an A/D converter for converting the analog signal into a digital signal;
    a network controller, said network controller controls data transmission and reception through an Internet protocol (IP) connection;
    a terminal-side IP connection establishing unit having an inbound socket connection for receiving control signals from the host computer and an independent outbound socket connection for sending digital signals to the host computer;
    a first control signal processing unit, said control signal processing unit receives a control signal related to at least one of a start request and a stop request received from the host computer; and
    a signal transmitting unit, said signal transmitting unit sends a digital signal to the control signal processing unit based on said control signal; and wherein
    the host computer comprises at least:
    a network adapter, wherein said network adapter controls data transmission and reception through an IP connection;
    a host-side IP connection establishing unit having an inbound socket connection for receiving digital signals from the analog signal input terminal and an independent outbound socket connection for sending control signals to the analog signal input terminal;
    a second control signal processing unit configured to generate and send at least a second control signal related to at least one of a start request and a stop request to the analog signal input terminal;
    an IP connection disconnecting unit connected to the host side IP connection establishing unit and configured to disconnect the inbound socket connection and the outbound socket connection;
    an application processing unit including:
    a high order application that generates settings, commands and data;
    a virtual sound driver that receives said settings, commands and data from said high order application;
    a buffer driver having temporary storage of said settings, commands and data received by said virtual sound driver;
    setting software that accesses said buffer driver, said setting software inputs and outputs said data to and from said analog input terminal; and
    an event notification feature, included in said buffer driver, that allows said buffer driver to compensate for the inability of the virtual sound driver and setting software to directly input and output said data by adjusting the timing, speed and amount of data input and output to the setting software and said virtual sound driver due to incorrect timing, speed and amount of data in said buffer driver; and, said setting software performs communication with said analog input terminal when said event notification feature is communicated from said buffer driver to said setting software.

2. The analog signal input system according to claim 1, wherein:
    the terminal-side IP connection establishing unit in the analog signal input terminal establishes the inbound socket connection from the host computer when the terminal-side IP connection establishing unit detects the outbound socket connection from the host computer; and
    the host-side IP connection establishing unit in the host computer establishes the outbound socket connection to the analog signal input terminal.

3. The analog signal input system according to claim 1, wherein the analog signal input terminal is provided with a microphone, an output signal from which is input into the analog signal input unit.

4. The analog signal input system according to claim 1, wherein the network is a wireless communication network, the network controller and network adapter being compatible with the wireless communication network.

5. The analog signal input system according to claim 1, wherein:
    the network uses the user datagram protocol (UDP) to include an IP packet at the time of the OP connection in a UDP packet; and characteristic information data related to the signal contents of the digital signal retrieved is included in a header field in the UDP protocol for transmission.

6. The analog signal input system according to claim 5, wherein the analog signal is a voice signal, and the characteristic information data is at least anyone of a voice level, a sampling rate, and the number of bits per sample.

7. The analog signal input system according to claim 1 wherein said analog signal input terminal provides stereo audio.

8. The analog signal input system according to claim 1 wherein said analog signal input terminal provides channel 5.1 audio.

9. An analog signal output system in which a digital signal is sent from a host computer to an analog signal output terminal through a network and the analog signal output terminal converts the digital signal into an analog signal and then outputs the analog signal, wherein
the analog signal output terminal comprises at least:
a network controller, said network controller controls data transmission and reception through an Internet protocol (IP) connection;
a terminal-side IP connection establishing unit having an inbound socket connection for receiving control signals from the host computer and an independent outbound socket connection for sending digital signals to the host computer;
a first control signal processing unit, said control signal processing unit receives control signal related to at least one of a start request and a stop request received from the host computer;
a signal receiving unit said signal receiving unit receives digital signals according to the control signal;
a D/A converter configured to convert the digital signals into analog signals; and
an output unit that outputs the analog signals; and wherein the host computer comprises at least:
a network adapter, wherein said network adapter controls data transmission and reception through an IP connection;
a host-side IP connection establishing unit having an inbound socket connection for receiving digital signals from the analog signal input terminal and, an independent outbound socket connection for sending control signal to the analog signal input terminal:
a second control signal processing unit configured to generate and send at least a second control signal related to at least one of a start request and a stop request to the analog signal output terminal;
a signal transmitting unit for sending a generated digital signal;
an IP connection disconnecting unit connected to the host IP connection establishing unit and configured to disconnect the inbound socket connection and the outbound socket connection;
an application processing unit including:
a high order application that generates settings, commands and data;
a virtual sound driver that receives said settings, commands and data from said high order application;
a buffer driver having temporary storage of said settings, commands and data received by said virtual sound driver;
setting software that accesses said buffer driver, said setting software inputs and outputs said data to and from said analog input terminal; and an event notification feature, included in said buffer driver, that allows said buffer driver to compensate for the inability of the virtual sound driver and setting software to directly input and output said data by adjusting the timing, speed and amount of data input and output to the setting software and said virtual sound driver due to incorrect timing, speed and amount of data in said buffer driver; and, said setting software performs communication with said analog input terminal when said event notification feature is communicated from said buffer driver to said setting software.

10. The analog signal output system according to claim 9, wherein:
the terminal-side IP connection establishing unit in the analog signal output terminal establishes the inbound socket connection from the host computer when the outbound socket connection from the host computer is detected; and
the host-side IP connection establishing unit in the host computer establishes the outbound socket connection to the analog signal output terminal.

11. The analog signal output system according to claim 9, wherein:
the analog signal output terminal has a buffer area and a data requesting unit, the data requesting unit sending a data transmission request signal according to a storage capacity of the buffer area; and
the signal transmitting unit in the host computer sends a digital signal according to the transmission request signal.

12. The analog signal output system according to claim 9, wherein a speaker is provided on the analog signal output terminal, and an output signal from the output unit being generated as voice from the speaker.

13. The analog signal output system according to claim 9, wherein the network is a wireless communication network, the controller and network adapter being compatible with the wireless communication network.

14. The analog signal output system according to claim 9, wherein:
the network uses the user datagram protocol (UDP) to include an IP packet at the time of the IP connection in a UDP packet; and
characteristic information data related to the signal contents of the digital signal retrieved is included in a header field in the UDP protocol for transmission.

15. The analog signal output system according to claim 14, the analog signal is a voice signal, and the characteristic information data is at least anyone of a voice level, a sampling rate, and the number of bits per sample.

16. The analog signal output system according to claim 9, wherein the analog signal output terminal has a buffer with a prescribed capacity, which is used to store digital signal received by the signal receiving unit; the analog signal output terminal also has at least a monitoring unit for monitoring an amount of digital signals stored in the buffer or a remaining capacity of the buffer and a synchronization control unit for changing a sampling clock in the D/A converter according to either the amount of digital signals stored or the remaining capacity; analog signal output by the output unit are synchronized.

17. The analog signal output system according to claim 16, wherein the analog signal output system has two or more analog signal output terminals for one host computer; two or more types of voice data, including right and left stereo channel voice data, are output to each analog signal output terminal, and voice outputs from the two or more analog signal output terminals are mutually synchronized by a function of the synchronization control unit.

18. The analog signal output system according to ally claim 9, wherein a remote operation terminal for remotely operating an output mode from the analog signal output terminal is provided on the network; the host computer and remote operation terminal are interconnected through an operation socket that is different from the inbound socket connection and outbound socket connection; when the remote operation terminal sends a remote operation signal to the host computer, the network adapter in the host computer receives the remote operation signal and then the control signal processing unit sends a control signal according to the remote operation signal.

19. The analog signal input system according to claim 9 wherein said analog signal input terminal provides stereo audio.

20. The analog signal input system according to claim 9 wherein said analog signal input terminal provides channel 5.1 audio.

* * * * *